(12) United States Patent
Weng et al.

(10) Patent No.: US 12,681,230 B2
(45) Date of Patent: Jul. 14, 2026

(54) LIGHT GUIDE MEMBER FOR LIGHT EMISSION DEVICE AND LIGHT EMISSION DEVICE

(71) Applicant: NITTO DENKO CORPORATION, Osaka (JP)

(72) Inventors: Yufeng Weng, Osaka (JP); Kozo Nakamura, Osaka (JP); Takahiro Yoshikawa, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 18/288,433

(22) PCT Filed: Jun. 16, 2022

(86) PCT No.: PCT/JP2022/024179
§ 371 (c)(1),
(2) Date: Oct. 26, 2023

(87) PCT Pub. No.: WO2023/276704
PCT Pub. Date: Jan. 5, 2023

(65) Prior Publication Data
US 2024/0230978 A1 Jul. 11, 2024

(30) Foreign Application Priority Data

Jun. 29, 2021 (JP) ................................. 2021-107331

(51) Int. Cl.
*F21V 8/00* (2006.01)
(52) U.S. Cl.
CPC ........... *G02B 6/006* (2013.01); *G02B 6/0035* (2013.01)
(58) Field of Classification Search
CPC .............................. G02B 6/006; G02B 6/0036
See application file for complete search history.

(56) References Cited

U.S. PATENT DOCUMENTS 8,834,004 B2 * 9/2014 Thompson ........... G02B 6/0035
362/617
11,650,364 B2 * 5/2023 Rinko .................. G02B 6/0065
362/606
(Continued)

FOREIGN PATENT DOCUMENTS

CN 209433049 9/2019
FR 2908523 A1 * 5/2008 ........... C03C 17/007
(Continued)

OTHER PUBLICATIONS

International Search Report issued in International Patent Application No. PCT/JP2022/024179, dated Aug. 16, 2022.
(Continued)

*Primary Examiner* — Fatima N Farokhrooz
(74) *Attorney, Agent, or Firm* — GREENBLUM & BERNSTEIN, P.L.C.

(57) ABSTRACT

A lightguide component for light emission devices has a first principal face and a second principal face at an opposite side from the first principal face. The lightguide component for light emission devices includes: a lightguide layer including a light-receiving portion to receive light emitted from a light source, a third principal face at the first principal face side, and a fourth principal face at the second principal face side; and a light distribution controlling structure having a plurality of internal spaces, the plurality of internal spaces creating interfaces to direct a portion of the light propagating in the lightguide layer toward the first principal face via total internal reflection. In a plan view a first region in which the light distribution controlling structure is present and a second region in which the light distribution controlling structure is not present are disposed so as to define a predetermined design.

5 Claims, 6 Drawing Sheets

(56)                References Cited

U.S. PATENT DOCUMENTS

| | | | | |
|---|---|---|---|---|
| 2002/0180910 | A1* | 12/2002 | Umemoto ........... | G02F 1/13338 349/113 |
| 2008/0129701 | A1* | 6/2008 | Murakami ........... | G06F 3/0443 345/173 |
| 2009/0086466 | A1* | 4/2009 | Sugita ............... | G02F 1/133615 362/97.1 |
| 2014/0043850 | A1* | 2/2014 | Thompson ........... | G02B 6/0035 359/558 |
| 2015/0168651 | A1* | 6/2015 | Nishiwaki ............. | H01L 31/054 250/237 R |
| 2016/0097895 | A1 | 4/2016 | Wolk et al. | |
| 2018/0136386 | A1 | 5/2018 | Takata et al. | |
| 2018/0156957 | A1 | 6/2018 | Larsen et al. | |
| 2019/0346612 | A1 | 11/2019 | Herlin et al. | |
| 2020/0166694 | A1 | 5/2020 | Sugino et al. | |
| 2020/0257044 | A1 | 8/2020 | Rinko | |
| 2021/0181399 | A1 | 6/2021 | Rinko | |

FOREIGN PATENT DOCUMENTS

| | | | | |
|---|---|---|---|---|
| JP | 2004-69729 | | 3/2004 | |
| JP | 4122161 | B2 * | 7/2008 | |
| JP | 2021-2065 | | 1/2021 | |
| KR | 20070105876 | A * | 4/2007 | |
| TW | 201837368 | | 10/2018 | |
| WO | WO-2007083805 | A1 * | 7/2007 | .......... G02B 6/0041 |
| WO | WO-2014057395 | A1 * | 4/2014 | .......... G02B 6/0018 |
| WO | 2019/026865 | | 2/2019 | |

OTHER PUBLICATIONS

Written Opinion issued in International Patent Application No. PCT/JP2022/024179, dated Aug. 16, 2022.
Partial supplementary European search report issued in EP Application No. 22832854.8, dated May 15, 2025.
Extended European Search Report issued in EP Application No. 22832854.8, dated Sep. 10, 2025.
Taiwanese Office Action and Search Report with an English translation of the Office Action received in TW Application No. 111123635, dated Feb. 9, 2026.
China Office Action and Search Report received in CN Application No. 202280032264.8, dated Apr. 22, 2026, and English translation.

* cited by examiner

LIGHT GUIDE MEMBER FOR LIGHT EMISSION DEVICE AND LIGHT EMISSION DEVICE

TECHNICAL FIELD

The present invention relates to lightguide components for light emission devices and light emission devices, and more particularly to lightguide components for light emission devices and light emission devices of sheet shape.

BACKGROUND ART

In recent years, use of next-generation solid state lighting (SSL), such as LED illumination, has been promoted. In illumination devices (which may also be referred to as "light emission devices"), configurations that incorporate a light source such as an LED and a light guide plate are widely used.

There is a need for light emission devices which are transparent when unactivated and which can emit light in the form of text characters or pictures when activated. As a method of realizing such a light emission device, there are known techniques that form structures for light extraction (e.g., fine prisms or a dot pattern) only on portions of the light guide plate by laser engraving, ink jet technique, or the like. As one aforementioned light emission device, Patent Document 1 discloses a light-point indicator in which a group of reflective dots, in the form of text characters or diagrams, are formed on a light guide plate.

CITATION LIST

Patent Literature

[Patent Document 1] Japanese Laid-Open Patent Publication No. 2004-069729

SUMMARY OF INVENTION

Technical Problem

However, regarding the designing of pattern density concerning structures for light extraction in a conventional light emission device, a trade off exists between an outgoing light amount from the light guide plate and the transparency of the light guide plate, such that trying to obtain a sufficient light amount makes it difficult to increase transparency.

When an light emission device as aforementioned is used for on-board applications, e.g., where a windowpane might be utilized as a light guide plate, thee need to maintain strength and transparency of the windowpane makes it impossible to directly process the surface shape or the like of the windowpane. Furthermore, since a front windshield and a rear windshield have curved shapes, processing across a large area may be difficult due to equipment constraints or the like.

Embodiments the present invention aim to provide a light emission device which can emit light in a predetermined design and which can provide sufficiently high transparency, and a lightguide component for light emission devices suitable for use in such a light emission device.

Solution to Problem

According to embodiments of the present invention, means for solution as recited in the following Items are provided.

[Item 1]

A lightguide component for light emission devices, the lightguide component having a first principal face and a second principal face that is at an opposite side from the first principal face, the lightguide component comprising:

a lightguide layer including a light-receiving portion to receive light emitted from a light source, a third principal face at the first principal face side, and a fourth principal face at the second principal face side; and a light distribution controlling structure having a plurality of internal spaces, the plurality of internal spaces creating interfaces to direct a portion of the light propagating in the lightguide layer toward the first principal face via total internal reflection, wherein, in a plan view from a normal direction of the first principal face, a first region in which the light distribution controlling structure is present and a second region in which the light distribution controlling structure is not present are disposed so as to define a predetermined design.

[Item 2]

The lightguide component for light emission devices of Item 1, comprising a textured film that includes a fifth principal face having a plurality of recesses, wherein, the plurality of recesses include: a plurality of first recesses which are located in the first region and which are not buried; and a plurality of second recesses which are located in the second region and which are substantially buried; and the plurality of internal spaces are defined by the plurality of first recesses in the textured film.

[Item 3]

The lightguide component for light emission devices of Item 2, comprising an adhesive layer disposed at the fifth principal face side of the textured film, wherein, the plurality of first recesses are not buried by the adhesive layer;

the plurality of second recesses are substantially buried by the adhesive layer; and the plurality of internal spaces are delineated by the plurality of first recesses in the textured film and by the adhesive layer.

[Item 4]

The lightguide component for light emission devices of Item 1, comprising a textured film that includes a fifth principal face having a plurality of recesses, wherein, the plurality of recesses are formed only in the first region and not in the second region; and the plurality of internal spaces are defined by the plurality of recesses in the textured film.

[Item 5]

The lightguide component for light emission devices of Item 4, comprising an adhesive layer disposed at the fifth principal face side of the textured film, wherein the plurality of internal spaces are delineated by the plurality of recesses in the textured film and by the adhesive layer.

[Item 6]

The lightguide component for light emission devices of any one of Items 1 to 5, wherein the plurality of internal spaces are formed in a redirection layer that is provided at the third principal face side or the fourth principal face side of the lightguide layer.

[Item 7]

The lightguide component for light emission devices of Item 6, further comprising a light coupling layer provided between the lightguide layer and the redirection layer, wherein the light coupling layer includes a plurality of low-refractive index regions that have a refractive index smaller than a refractive index of the lightguide layer.

[Item 8]

A lightguide component for light emission devices, the lightguide component having a first principal face and a second principal face that is at an opposite side from the first principal face, the lightguide component comprising:

a lightguide layer including a light-receiving portion to receive light emitted from a light source, a third principal face at the first principal face side, and a fourth principal face at the second principal face side; and a light distribution controlling structure having a plurality of internal spaces, the plurality of internal spaces creating interfaces to direct a portion of the light propagating in the lightguide layer toward the first principal face via total internal reflection, wherein, the plurality of internal spaces are formed in a redirection layer that is provided at the third principal face side or the fourth principal face side of the lightguide layer, the lightguide component for light emission devices further comprising a light coupling layer provided between the lightguide layer and the redirection layer, the light coupling layer including a plurality of low-refractive index regions that have a refractive index smaller than a refractive index of the lightguide layer, wherein, in a plan view from a normal direction of the first principal face, a first region in which the light coupling layer is present and a second region in which the light coupling layer is not present are disposed so as to define a predetermined design.

[Item 9]

The lightguide component for light emission devices of Item 8, comprising a plurality of porous regions provided between the lightguide layer and the redirection layer, the plurality of porous regions having an internal void structure, wherein, the plurality of porous regions are formed only in the first region and not in the second region; and the plurality of low-refractive index regions are defined by the plurality of porous regions.

[Item 10]

The lightguide component for light emission devices of Item 8, comprising a plurality of porous regions provided between the lightguide layer and the redirection layer, the plurality of porous regions having an internal void structure, wherein, the plurality of porous regions include: a plurality of first porous regions which are located in the first region and in which the void structure is not buried; and a plurality of second porous regions which are located in the second region and in which the void structure is substantially buried; and the plurality of low-refractive index regions are defined by the plurality of first porous regions.

[Item 11]

The lightguide component for light emission devices of Item 10, comprising an adhesive layer provided in contact with the plurality of porous regions, wherein, the void structure of the plurality of first porous regions is not buried by the adhesive layer; and the void structure of the plurality of second porous regions is substantially buried by the adhesive layer.

[Item 12]

The lightguide component for light emission devices of any one of Items 1 to 11, wherein the lightguide layer increases in thickness away from the light-receiving portion.

[Item 13]

A light emission device comprising:

the lightguide component for light emission devices of any one of Items 1 to 12; and a light source to emit light toward the light-receiving portion.

Advantageous Effects of Invention

According to an embodiment of the present invention, a light emission device which can emit light in a predetermined design and which can provide sufficiently high transparency and a lightguide component for light emission devices suitable for use in such a light emission device can be provided.

DESCRIPTION OF EMBODIMENTS

Hereinafter, with reference to the drawings, lightguide components for light emission devices and light emission devices according to embodiments of the present invention will be described. Note that lightguide components for light emission devices and light emission devices according to embodiments of the present invention are not limited to those illustrated in the following description.

Embodiment 1

Figures 1, 2:
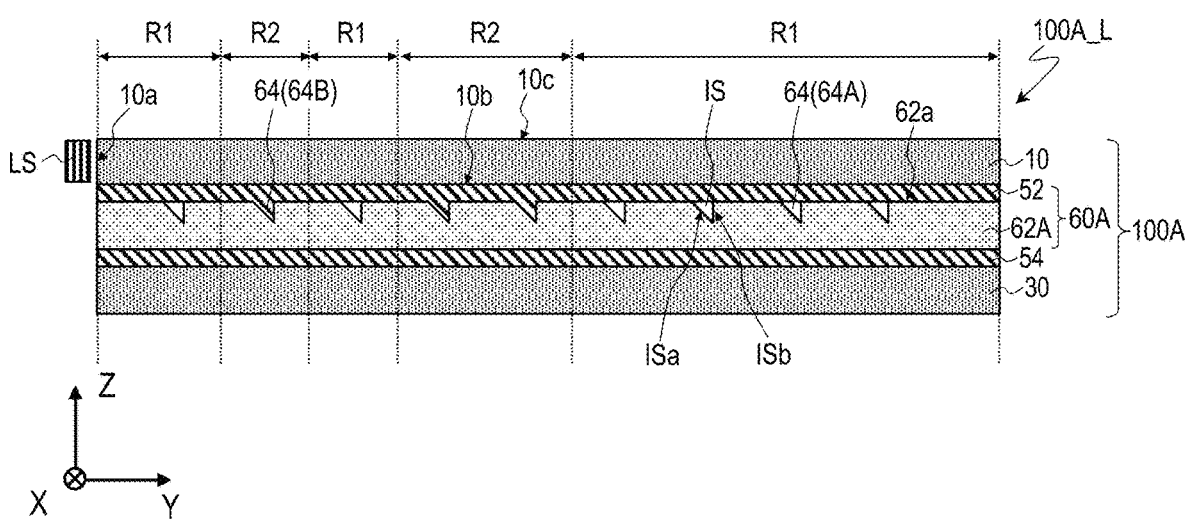
FIG. 1 A cross-sectional view schematically showing a light emission device 100A_L according to an embodiment of the present invention.
FIG. 2 A plan view showing examples of first regions R1 and second regions R2 included in the light emission device 100A_L.

Configurations of Lightguide Component for Light Emission Devices, and Light Emission Device With reference to FIG. 1, a light emission device (illumination device) 100A_L according to the present embodiment will be described. FIG. 1 is a cross-sectional view schematically showing the light emission device 100A_L.

As shown in FIG. 1, the light emission device 100A_L includes a light source LS and a lightguide component 100A.

The light source LS is an LED device, for example. As the light source LS, a plurality of LED devices may be used. The plurality of LED devices are arranged along the X direction, for example.

The lightguide component 100A has a sheet shape including a first principal face and a second principal face that is at an opposite side from the first principal face. In FIG. 1, the lower principal face is the first principal face, whereas the upper principal face is the second principal face. Herein, "sheet shape" is a notion that encompasses plate shapes and film shapes and is irrespective of the rigidity (flexibility) and thickness of the sheet. A sheet-shaped lightguide component may be used in various forms, including roll shapes.

The lightguide component 100A receives light that is emitted from the light source LS, propagates the light in the Y direction, and allows the light to be emitted in the −Z direction. Therefore, the first principal face of the lightguide component 100A functions as a light-outgoing surface. It will be appreciated that the propagating direction of light has some variation (distribution) off the Y direction, and that the outgoing direction of light also has some variation (distribution) off the −Z direction. Between the lightguide component 100A and the light source LS, coupling optics for efficiently guiding the light emitted from the light source LS to the lightguide component 100A may be provided.

The lightguide component 100A includes a lightguide layer 10 and a light distribution controlling structure having a plurality of internal spaces IS.

The lightguide layer 10 includes: a light-receiving portion at which light emitted from the light source LS is received; a third principal face 10b located at the first principal face side (i.e., the light-outgoing surface side); and a fourth principal face 10c located at the second principal face side (i.e., an opposite side from the light-outgoing surface). In the illustrated example, the light-receiving portion of the lightguide layer 10 is a side surface (light-receiving side face) 10a at the light source LS side of the lightguide layer 10. Also in the illustrated example, since the lightguide layer 10 is located on the outermost surface at the second principal face side of the lightguide component 100A, the fourth principal face 10c of the lightguide layer 10 is the second principal face of the lightguide component 100A.

The plurality of internal spaces IS included in the light distribution controlling structure create interfaces to direct a portion of the light propagating in the lightguide layer 10 toward the first principal face via total internal reflection (TIR). Each internal space IS includes: a first slope ISa to direct a portion of the light propagating in the lightguide layer 10 toward the first principal face via total internal reflection; and a second slope ISb that is at an opposite side from the first slope ISa.

In the illustrated lightguide component 100A, the light distribution controlling structure having a plurality of internal spaces IS is formed in a redirection layer 60A that is provided at the third principal face 10b side of the lightguide layer 10. The redirection layer 60A is composed of: a textured film 62A that includes a fifth principal face 62a having a plurality of recesses 64; and an adhesive layer 52 that is disposed on the fifth principal face 62a side of the textured film 62A. The adhesive layer 52 is located between the textured film 62A and the lightguide layer 10, such that the adhesive layer 52 bonds the lightguide layer 10 and the textured film 62A together.

In the illustrated example, an adhesive layer 54 and a base layer 30 are disposed in this order at the first principal face side of the redirection layer 60A, such that the adhesive layer 54 bonds the textured film 62A and the base layer 30 together. The lightguide layer 10 and the base layer 30 may be transparent substrates or films. Preferable configurations for the lightguide layer 10, the base layer 30, the textured film 62A, and the adhesive layers 52 and 54 will be described later.

The light emission device 100A_L includes: regions (hereinafter referred to as "first regions") R1 in which the light distribution controlling structure is present; and regions (hereinafter referred to as "second regions") R2 in which the light distribution controlling structure is not present. The first regions R1 and second regions R2 are disposed so as to define a predetermined design in a plan view from a normal direction of the first principal face. As used herein, a "design" encompasses text characters, numbers, symbols, pictures, patterns, and any combination thereof, etc.

FIG. 2 shows an example placement of first regions R1 and second regions R2. FIG. 2 illustrates the light emission device 100A_L when activated.

As shown in FIG. 2, the first regions R1, in which the light distribution controlling structure is present, are regions that emit light in an activated state (emitting regions), whereas second regions R2, in which the light distribution controlling structure is not present, are regions that substantially do not emit light in an activated state (non-emitting regions). It is needless to say that the design to be defined by the first regions R1 and the second regions R2 is not limited to what is exemplified in FIG. 2.

In the present embodiment, the first regions R1 and the second regions R2 are differentiated based on whether the recesses 64 in the textured film 62A are buried by the adhesive layer 52 or not. As shown in FIG. 1, the plurality of recesses 64 in the textured film 62A include: a plurality of first recesses 64A which are located in the first regions R1 and which are not buried by the adhesive layer 52; and a plurality of second recesses 64B which are located in the second regions R2 and which are substantially buried by the adhesive layer 52.

The plurality of internal spaces IS are delineated by the plurality of first recesses 64A in the textured film 62A and by the adhesive layer 52. In other words, any region in which first recesses 64A that are not buried by the adhesive layer 52 are located defines a first region R1 in which the light distribution controlling structure is present. On the other hand, any region in which second recesses 648 that are substantially buried by the adhesive layer 52 are located defines a second region R2 which does not function as a light distribution controlling structure (i.e., the light distribution controlling structure is not present).

By adjusting the cross-sectional shape, size, density of placement, and distribution of the internal spaces IS, it is possible to control the intensity distribution of light emitted from the first regions R1. The internal spaces IS are typically void portions (air cavities) filled with air inside. As a light distribution controlling structure having a plurality of internal spaces IS, for example, a light distribution structure which is described in International Publication No. 2019/087118 can be used. The entire disclosure of International Publication No. 2019/087118 is incorporated herein by reference.

Moreover, by adjusting the cross-sectional shape, size, density of placement, and distribution of the internal spaces IS, it is possible to control the visible light transmittance and haze value of the lightguide component 100A. The visible light transmittance of the lightguide component 100A is e.g. 60% or more, and preferably 80% or more. The haze value of the lightguide component 100A is e.g. less than 30%, and preferably less than 10%. It is defined herein that light having a wavelength of not less than 380 nm and not more than 780 nm is visible light. The visible light transmittance haze value can be measured by using a haze meter (manufactured by MURAKAMI COLOR RESEARCH LABORA-TORY CO., LTD.: product name HM-150), for example. From the standpoint of watching an object (indication) through the light emission device 100A_L (lightguide component 100A), the lightguide component 100A preferably has a visible light transmittance of 60% or more, and the lightguide component 100A preferably has a haze value of less than 30%.

In a plan view of the lightguide component 100A from the normal direction of the first principal face, a ratio of the area of the plurality of internal spaces IS to the area of the first region R1 (occupied area percentage) is preferably not less than 1% and not more than 80%, and further preferably not less than 1% and not more than 50%. From the standpoint of obtaining a low haze value, the occupied area percentage of the internal spaces IS is preferably 30% or less, and further preferably 10% or less.

Figure 3:
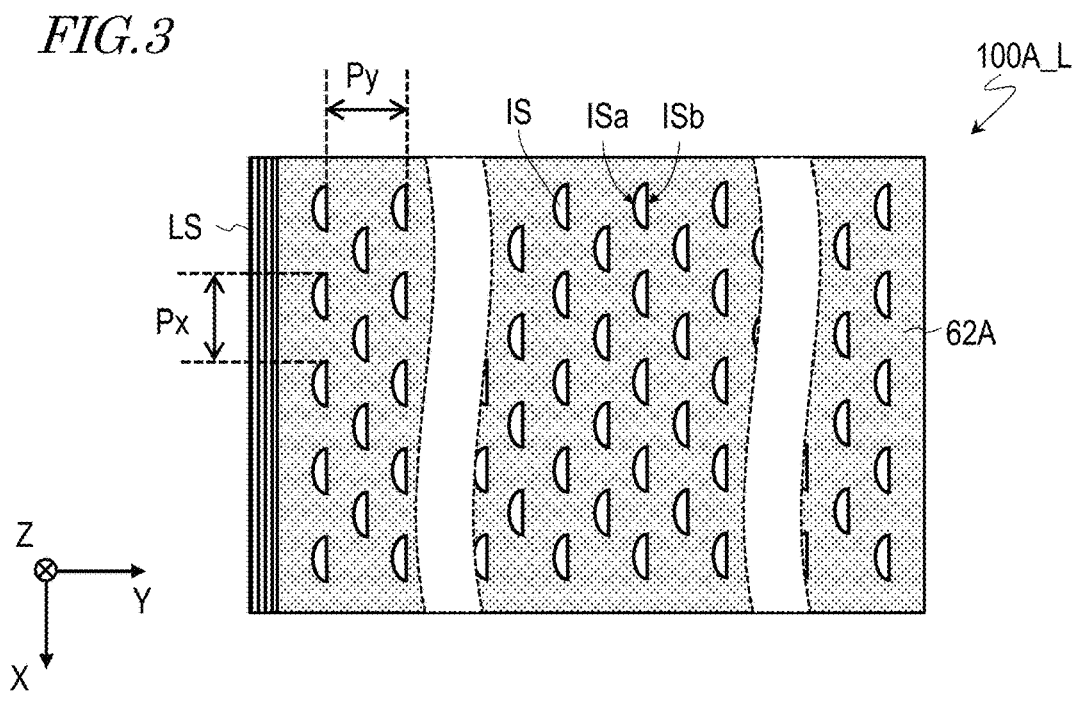
FIG. 3 A plan view schematically showing the light emission device 100A_L.
Figure 4:
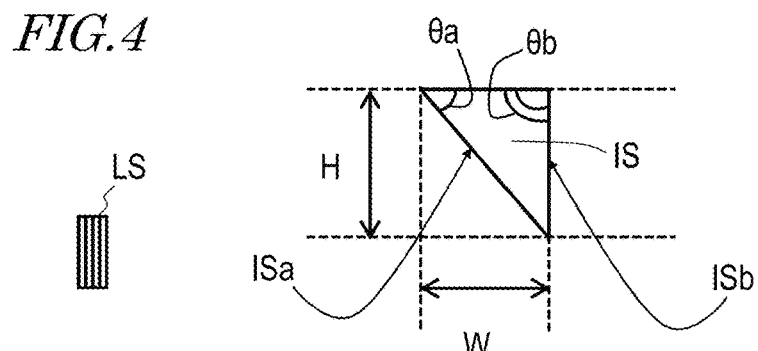
FIG. 4 A cross-sectional view schematically showing an internal space IS included in a light distribution controlling structure of the light emission device 100A_L.
Figure 5:
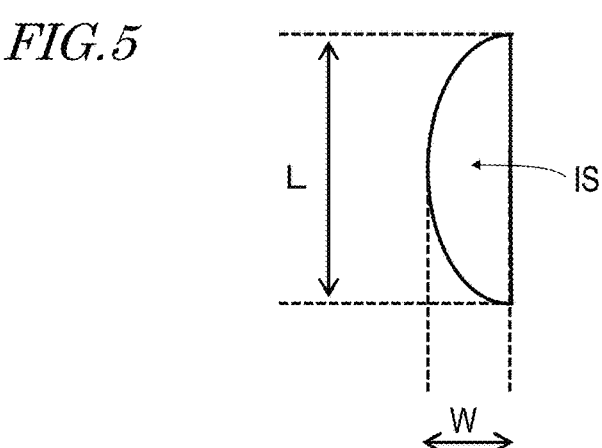
FIG. 5 A plan view schematically showing an internal space IS.

With reference to FIG. 3, FIG. 4, and FIG. 5, the shapes and example placement of the internal spaces IS will be described. FIG. 3 is a plan view schematically showing the light emission device 100A_L. FIG. 4 is a cross-sectional view schematically showing an internal space IS, and FIG. 5 is a plan view schematically showing an internal space IS.

As shown in FIG. 3, the plurality of internal spaces IS may be disposed discretely along the light-guiding direction of the lightguide layer 10 (the Y direction) and along a direction that intersects the light-guiding direction, for example. A discrete placement may have periodicity (regularity) along at least one direction, or may not have any regularity. However, from a mass producibility standpoint, it is preferable that the plurality of internal spaces IS are disposed uniformly within the first region R1. For example, in the example shown in FIG. 3, a plurality of internal spaces IS having a curved surface of a substantially identical shape, which is convex in an identical direction, are disposed discretely and periodically along a light-guiding direction of the light guide plate 10 (the Y direction) and a direction (the X direction) that is orthogonal to the light-guiding direction. In this case, a pitch Px of the internal spaces IS along the X direction is preferably e.g. not less than 10 μm and not more than 500 μm, and a pitch Py of the internal spaces IS along the Y direction is preferably e.g. not less than 10 μm and not more than 500 μm. In the example shown in FIG. 3, some internal spaces IS are disposed with a ½ pitch shift in each of the Y direction and the X direction.

As shown in FIG. 3, in a plan view from the normal direction of the first principal face of the lightguide component 100A, the first slope ISa creates a curved surface that is convex toward the light source LS. In the case where a plurality of LED devices that are arrayed along the X direction are used as the light source LS, light emitted from each LED device has some spread with respect to the Y direction; therefore, in order to uniformly act on light, the first slope ISa may have a curved surface that is convex toward the light source LS. The first slope ISa may be parallel to the X direction when coupling optics are provided between the light source LS and the light-receiving side face 10a of the lightguide layer 10 so as to allow light of a high degree of parallelism (i.e., light which does not have much spread with respect to the Y direction) to enter. Instead of discrete internal spaces IS, for example, internal spaces may be provided in the form of grooves extending along the X direction (e.g., triangular prisms).

As shown in FIG. 4, a cross-sectional shape of an internal space IS (i.e., shape of a cross section which is perpendicular to the X direction and which is parallel to the YZ plane in FIG. 1) is a triangle having a vertex angle at the first principal face side of the lightguide component 100A (i.e., the −Z direction in FIG. 1), for example. A sloping angle θa of the first slope ISa that is closer to the light source LS is e.g. not less than 10° and not more than 70°. When the sloping angle θa is less than 10°, there is less controllability of light distribution, and the light extraction efficiency may also decrease. On the other hand, when the sloping angle θa exceeds 70°, it may be difficult to process the textured film, for example. A sloping angle θb of the second slope ISb is e.g. not less than 50° and not more than 100°. When the sloping angle θb is less than 50°, stray light may occur in unintended directions. On the other hand, when the sloping angle θb exceeds 100°, it may be difficult to process the textured film, for example. Note that the cross-sectional shape of the internal space IS may be a trapezoid or the like, without being limited to a triangle as exemplified herein.

As shown in FIG. 5, the two-dimensional size of the internal space IS is defined by a length L and a width W of the internal space IS. The length L of the internal space IS is preferably e.g. not less than 10 μm and not more than 500 μm. The width W of the internal space IS is preferably e.g. not less than 1 μm and not more than 100 μm. The length L of the internal space IS is e.g. more than twice the width W of the internal space IS. From the standpoint of light extraction efficiency, the height H (see FIG. 4) of the internal space IS is preferably e.g. not less than 1 μm and not more than 100 μm.

As described above, in the light emission device 100A_L according to the present embodiment, the first regions R1, in which the light distribution controlling structure is present, and the second regions R2, in which the light distribution controlling structure is not present, are disposed so as to define a predetermined design, thus making it possible to emit light in a predetermined design. As a result, illumination (light emission) that is full of fancifulness and fun can be realized.

Moreover, because the light emission device 100A_L according to the present embodiment includes a light distribution controlling structure having a plurality of internal spaces IS (i.e., utilizing total internal reflection), a high transparency (visible light transmittance) can be achieved. The lightguide component 100A of the light emission device 100A_L may have a visible light transmittance of e.g. 60% or more (preferably 80% or more).

A sheet-shaped light emission device 100A_L may be suitably used as a light emission device for on-board use by being attached to a windowpane of an automobile. Because the light emission device 100A_L having the aforementioned configuration can be flexible, it can also be attached on a piece of curved glass. Therefore, the light emission device 100A_L may be disposed on a front windshield or a rear windshield, each of which is a large-area piece of curved glass. Note that a windowpane may be utilized as a part of the light emission device 100A_L (e.g., the light-guide layer 10 or the base layer 30). Without being limited to on-board applications, the light emission device 100A_L may also be used for a show window or the like.

As will be described later, a light distribution controlling structure having a plurality of internal spaces IS may be formed on the lightguide layer 10. However, as in the present embodiment, forming a light distribution controlling structure having a plurality of internal spaces IS in the redirection layer 60A makes it easy to achieve high transparency in an unactivated state, high efficiency of light utilization in an activated state, high reliability, and high directivity toward one side.

In the case of forming the internal spaces IS in the lightguide layer 10, as will be described later, for example, a minute pattern (recesses) defining the internal spaces IS might be formed on a film through laser processing; in that case, however, it may be difficult to form anisotropic shapes that are suitable as the internal spaces IS. If the anisotropic shapes are unsuitable, external light (ambient light) might be reflected in various directions by irregular interfaces, thus resulting in poor transparency in an unactivated state. Directivity in an activated state may also decrease, and efficiency of light utilization may decrease. Even if suitable anisotropic shapes are successfully formed, the peripheral portions of the recesses may undergo degradation due to energy uneven-ness of laser light. Because change in refractive index will occur in such degraded portions, scattering may occur due to a refractive index difference. This may unfavorably affect transparency and directivity. Reliability may also decrease. In contrast, forming a light distribution controlling structure having a plurality of internal spaces IS in the redirection layer 60A makes it easy to achieve high transparency in an unactivated state, high efficiency of light utilization in an activated state, high reliability, and high directivity toward one side.

Examples of Preferable Configurations for Lightguide Layer, Base Layer, Textured Film, and Adhesive Layer The lightguide layer 10 may be made of a known material having a high transmittance with respect to visible light. The lightguide layer 10 is made of an acrylic resin such as polymethyl methacrylate (PMMA), a polycarbonate (PC)-based resin, a cycloolefin-based resin, or glass (e.g., quartz glass, non-alkaline glass, borosilicate glass), for example. The refractive index $n_{GP}$ of the lightguide layer 10 is e.g. not less than 1.40 and not more than 1.80. Unless otherwise specified, the refractive index refers to a refractive index that is measured with an ellipsometer at a wavelength of 550 nm. The thickness of the lightguide layer 10 can be appropriately set depending on the application. The thickness of the lightguide layer 10 is e.g. not less than 0.05 mm and not more than 50 mm.

The thickness of the base layer 30 is e.g. not less than 1 μm and not more than 1000 μm, preferably not less than 10 μm and not more than 100 μm, and further preferably not less than 20 μm and not more than 80 μm. The refractive index of the base layer 30 is preferably not less than 1.40 and not more than 1.70, and further preferably not less than 1.43 and not more than 1.65.

The textured film 62A in which to form the internal spaces IS can be produced by a method that is described in Japanese National Phase PCT Laid-Open Publication No. 2013-524288, for example. Specifically, for example, the surface of a polymethyl methacrylate (PMMA) film may be coated with a lacquer (manufactured by Sanyo Chemical Co., FINECURE RM-64); an optical pattern may be embossed on the film surface including the lacquer; and thereafter the lacquer may be cured to produce the textured film 62A.

The thicknesses of the adhesive layers 52 and 54 are, each independently, e.g. not less than 0.1 μm and not more than 100 μm, preferably not less than 0.3 μm and not more than 100 μm, and further preferably not less than 0.5 μm and not more than 50 μm. The refractive indices of the adhesive layers 52 and 54 are, each independently, preferably not less than 1.42 and not more than 1.60, and more preferably not less than 1.47 and not more than 1.58. Moreover, the refractive indices of the adhesive layers 52 and 54 are preferably close to the refractive index of the lightguide layer 10, the base layer 30, or the textured film 62A that they are in contact with, and preferably the difference in refrac-tive index has an absolute value of 0.2 or less.

As used herein, "adhesive" is meant to include pressure-sensitive adhesives (also called tackiness agents). Specific examples of adhesives include rubber-based adhesives, acrylic adhesives, silicone-based adhesives, epoxy-based adhesives, cellulose-based adhesives, and polyester-based adhesives. These adhesives may be used each alone, or two or more of them may be used in combination.

Preferably, the adhesive layer 52 is able to achieve bonding without burying the first recesses 64A in the surface of the textured film 62A. As an adhesive that is suitable for the formation of the adhesive layer 52, adhesives that are described in International Publication No. 2021/167090, International Publication No. 2021/167091, or International Application PCT/JP2022/004554 by the Applicant can be suitably used. The entire disclosure of these applications is incorporated herein by reference. Particularly preferable is the polyester-based adhesive described in International Application PCT/JP2022/004554.

In order for the adhesive layer 52 to substantially bury the second recesses 64B without burying the first recesses 64A among the plurality of recesses 64 in the textured film 62A, for example, a mask having a mask pattern that corresponds to the placement of the first regions R1 and the second regions R2 (apertures corresponding to the first regions R1) may be employed when using a laminating machine to attach together the lightguide layer 10 and the textured film 62A via the adhesive layer 52. Various conditions (e.g., the nip pressure of the laminating machine) involved in the attaching may be appropriately set in accordance with the specifications of the adhesive used, the size of the recesses 64, and the like.

Note that the second recesses 64B in the textured film 62A do not need to be completely buried by the adhesive layer 52, but may be substantially buried only to an extent where they no longer function as a light distribution controlling structure.

Other Examples of Second Recesses

The aforementioned example illustrates a configuration in which the second recesses 64B in the textured film 62A are buried with the adhesive layer 52 for attaching together lightguide layer 10 and the textured film 62A. The second recesses 64B may be substantially buried with any material, other than the adhesive layer 52, so as not to function as a light distribution controlling structure. It is preferable that the material to bury the second recesses 64B has a refractive index which is close to the refractive index of the textured film 62A, so as to result in a refractive index difference with an absolute value of 0.2 or less. After selectively burying some recesses 64 among the plurality of recesses 64 in the textured film 62A (i.e., the recesses 64 to become the second recesses 64B) with some material (e.g., an adhesive), the lightguide layer 10 and the textured film 62A may be attached together, etc., via the adhesive layer 52, thereby layering the lightguide layer 10 and the textured film 62A to obtain a structure in which the first recesses 64A and the second recesses 64B are mixedly present.

Other Examples of Redirection Layer

Figure 6:
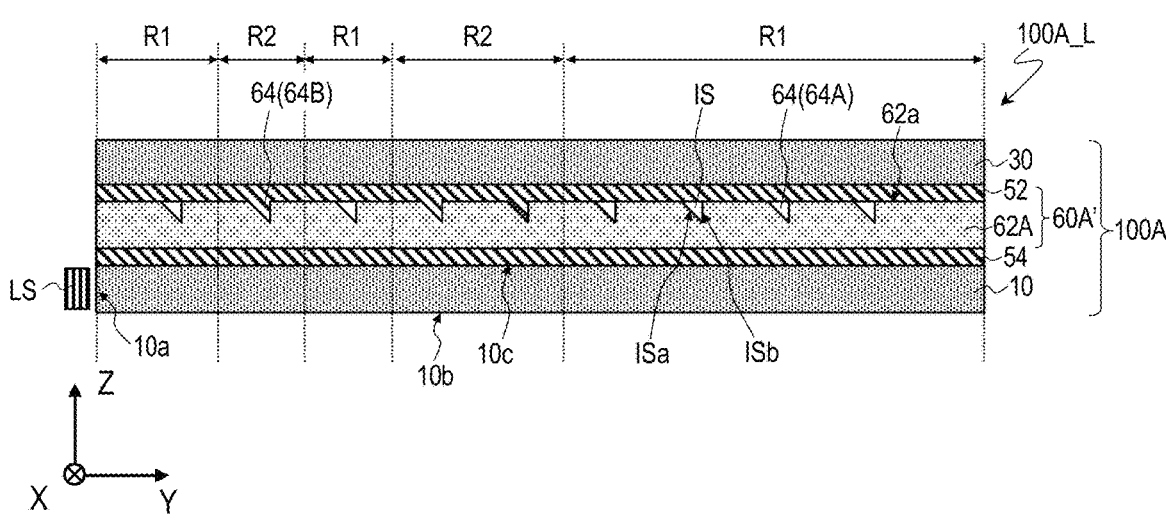
FIG. 6 A cross-sectional view schematically showing the light emission device 100A_L.

FIG. 1 shows an example where a light distribution controlling structure is formed in the redirection layer 60A being provided at the third principal face 10b side of the lightguide layer 10. As shown in FIG. 6, however, a light distribution controlling structure may be formed in a redirection layer 60A' that is provided at the fourth principal face 10c side of the lightguide layer 10. The redirection layer 60A' is composed of: a textured film 62A that includes a fifth principal face 62a having a plurality of recesses 64; and an adhesive layer 52 that is disposed on the fifth principal face 62a side of the textured film 62A. At an opposite side of the adhesive layer 52 from the textured film 62A is disposed the base layer 30, such that the textured film 62A and the base layer 30 are bonded together by the adhesive layer 52. Moreover, the lightguide layer 10 and the textured film 62A are bonded together by an adhesive layer 54 that is disposed at the fourth principal face 10c side of the lightguide layer 10. In the example shown in FIG. 6, because the lightguide layer 10 is located on the outermost surface at the first principal face side of the lightguide component 100A, the third principal face 10b of the lightguide layer 10 is the first principal face of the lightguide component 100A.

Other Examples of Light Source Placement

Figure 7:
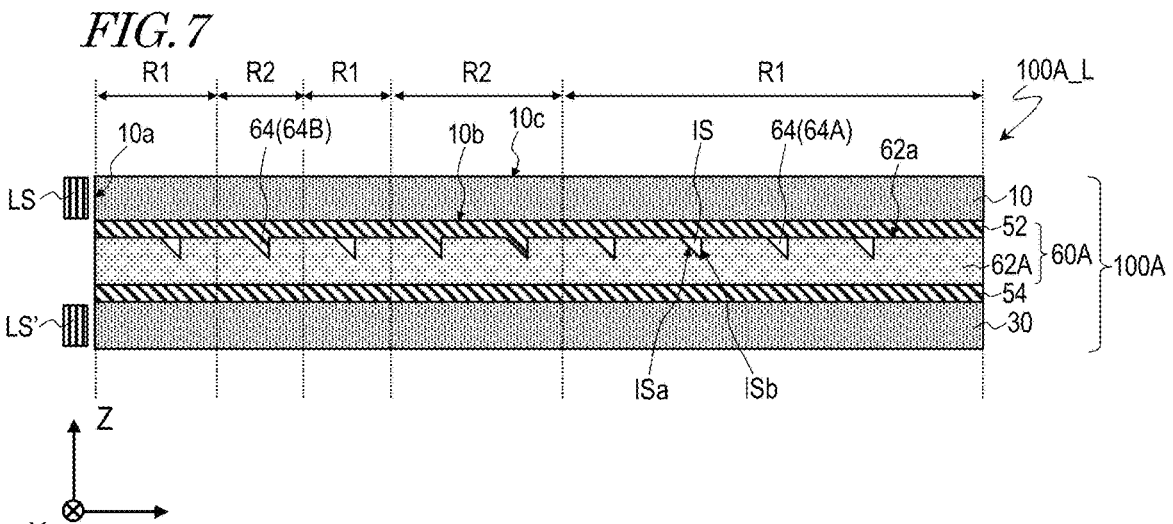
FIG. 7 A cross-sectional view schematically showing the light emission device 100A_L.

As shown in FIG. 7, in addition to the light source LS to emit light toward the light-receiving side face 10a of the lightguide layer 10, a further light source LS' may be provided to emit light toward an end face of the base layer 30 (i.e., the end face located at the same side as the light-receiving side face 10a of the lightguide layer 10). In this case, the base layer 30 may be regarded as functioning as a further lightguide layer.

Embodiment 2

Figure 8:
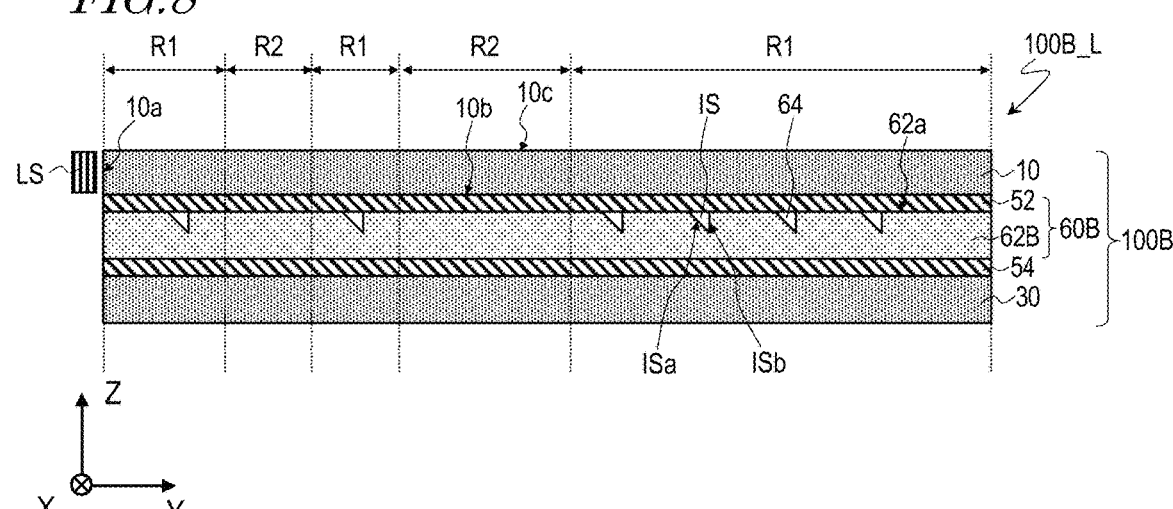
FIG. 8 A cross-sectional view schematically showing a light emission device 100B_L according to an embodiment of the present invention.

With reference to FIG. 8, a light emission device 100B_L according to the present embodiment will be described. FIG. 8 is a cross-sectional view schematically showing the light emission device 100B_L. The following description will be mainly directed to differences of the light emission device 100B_L according to the present embodiment from the light emission device 100A_L according to Embodiment 1.

As shown in FIG. 8, a lightguide component 100B included in the light emission device 100B_L includes a light distribution controlling structure having a plurality of internal spaces IS, as does the lightguide component 100A of the light emission device 100A_L. The light distribution controlling structure having a plurality of internal spaces IS is formed in a redirection layer 60B that is provided at the third principal face 10b side of the lightguide layer 10. The redirection layer 60B is composed of: a textured film 62B that includes a fifth principal face 62a having a plurality of recesses 64; and an adhesive layer 52 that is disposed on the fifth principal face 62a side of the textured film 62B.

The light emission device 100B_L includes first regions R1 in which the light distribution controlling structure is present and second regions R2 in which the light distribution controlling structure is not present. The first regions R1 and the second regions R2 are disposed so as to define a predetermined design in a plan view from a normal direction of the first principal face.

In the present embodiment, the first regions R1 and the second regions R2 are differentiated based on whether the recesses 64 of the textured film 62B are formed or not. As shown in FIG. 8, the plurality of recesses 64 of the textured film 62B are formed only in the first regions R1 and not in the second regions R2 (i.e., selectively in the first regions R1).

The plurality of internal spaces IS are delineated by the plurality of recesses 64 in the textured film 62B and by the adhesive layer 52. Therefore, any region in which recesses 64 exist defines a first region R1 in which the light distribution controlling structure is present. On the other hand, any region in which recesses 64 do not exist defines a second region R2 which does not function as a light distribution controlling structure (i.e., the light distribution controlling structure is not present).

Similarly to the light emission device 100A_L according to Embodiment 1, the light emission device 100B_L according to the present embodiment is also able to emit light in a predetermined design, and achieve a high transparency (visible light transmittance).

Embodiment 3

Figure 9:
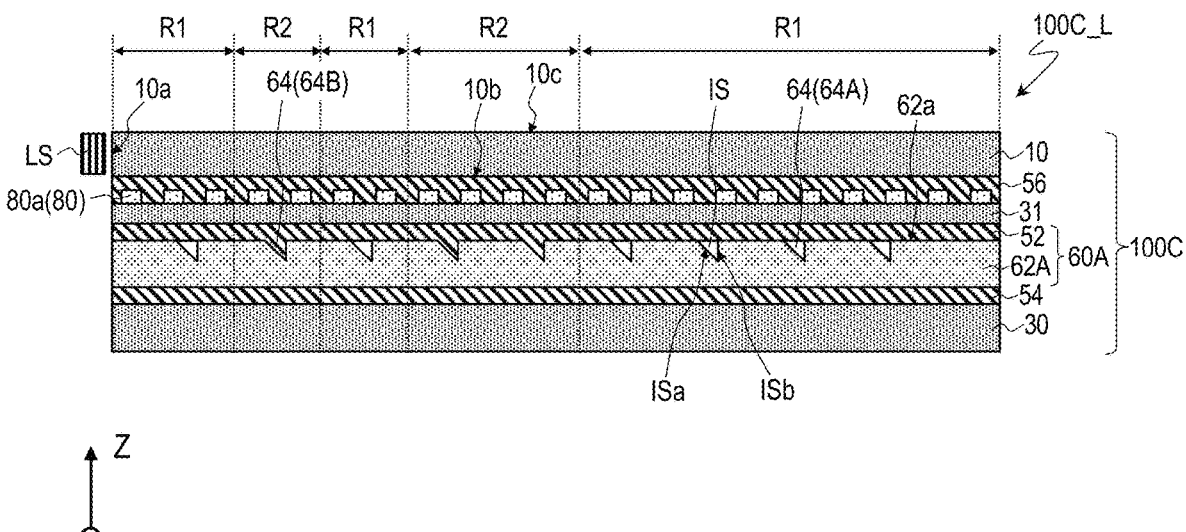
FIG. 9 A cross-sectional view schematically showing a light emission device 100C_L according to an embodiment of the present invention.

With reference to FIG. 9, a light emission device 100C_L according to the present embodiment will be described. FIG. 9 is a cross-sectional view schematically showing the light emission device 100C_L. The following description will be mainly directed to differences of the light emission device 100C_L according to the present embodiment from the light emission device 100A_L according to Embodiment 1.

As shown in FIG. 9, a lightguide component 100C included in the light emission device 100C_L includes a light distribution controlling structure having a plurality of internal spaces IS, as does the lightguide component 100A of the light emission device 100A_L. The light distribution controlling structure having a plurality of internal spaces IS is formed in a redirection layer 60A that is provided at the third principal face 10b side of the lightguide layer 10. The redirection layer 60A is similar in configuration to the redirection layer 60A of the light emission device 100A_L according to Embodiment 1.

The lightguide component 100C further includes a light coupling layer 80 that is provided between the lightguide layer 10 and the redirection layer 60A. The light coupling layer 80 includes a plurality of low-refractive index regions 80a that have a refractive index $n_C$ smaller than the refractive index $n_{GP}$ of the lightguide layer 10. Each low-refractive index region 80a is formed as a dot that is sized not less than 1 μm and not more than 1000 μm, for example.

The light coupling layer 80 having a plurality of low-refractive index regions 80a is supported by a base layer 31, such that the lightguide layer 10 and the base layer 31 are bonded together by an adhesive layer 56. The base layer 31 and textured film 62A of the redirection layer 60A are bonded together by an adhesive layer 52.

In the light emission device 100C_L according to the present embodiment, the light coupling layer 80 having a plurality of low-refractive index regions 80*a* is provided to allow light propagating in the lightguide layer 10 to be selectively and efficiently guided to the redirection layer 60A. By adjusting the density of placement of the plurality of low-refractive index regions 80*a*, it is possible to control the uniformity of light emitted from the first regions R1. For example, the low-refractive index regions 80*a* may be disposed so as to be denser at the light source LS side and to become sparser away from the light source LS, whereby light uniformity can be improved.

Examples of Preferable Configurations for Light Coupling Layer (Low-Refractive Index Region)

The refractive index $n_C$ of the low-refractive index regions 80*a* is preferably not less than 1.05 and not more than 1.30, and still more preferably not less than 1.05 and not more than 1.25. The difference between the refractive index np of the lightguide layer 10 and the refractive index $n_C$ of the low-refractive index regions 80*a* is preferably 0.20 or more, more preferably 0.23 or more, and still more preferably 0.25 or more. Low-refractive index regions 80*a* having a refractive index $n_C$ of 1.30 or less may be porous regions having an internal void structure, for example. The thickness of the low-refractive index regions 80*a* is e.g. not less than 0.3 μm and not more than 5 μm.

When the low-refractive index regions 80*a* are porous regions, their porosity is preferably 35 volume % or more, more preferably 38 volume % or more, and especially preferably 40 volume % or more. Within such ranges, low-refractive index regions 80*a* having a particularly low refractive index can be formed. The upper limit of the porosity layer is e.g. 90 volume % or less, and preferably 75 volume % or less. Within such ranges, low-refractive index regions 80*a* with good strength can be formed. The porosity is a value that is calculated according to Lorentz-Lorenz's formula from a value of the refractive index measured with an ellipsometer.

As the low-refractive index regions 80*a*, for example, a low-refractive index layer having a void structure as disclosed in International Publication No. 2019/146628 can be used. The entire disclosure of International Publication No. 2019/146628 is incorporated herein by reference. Specifically, low-refractive index regions 80*a* having a void structure may include: essentially spherical particles such as silica particles, silica particles having micropores, and silica hollow nanoparticles; fibrous particles such as cellulose nanofibers, alumina nanofibers, and silica nanofibers; and flat-plate particles such as nanoclay composed of bentonite. The low-refractive index regions 80*a* having a void structure may be a porous material composed of particles (e.g., micropored particles) that are chemically bonded directly to one another. The particles composing the low-refractive index regions 80*a* having a void structure may be at least partially bonded to one another via a small amount (e.g., less than the mass of the particles) of a binder component. The porosity and refractive index $n_C$ of the low-refractive index regions 80*a* can be adjusted based on the particle size, particle size distribution, and the like of the particles composing the low-refractive index regions 80*a*.

Examples of methods of obtaining low-refractive index regions 80*a* having a void structure include methods that are described in Japanese Laid-Open Patent Publication No. 2010-189212, Japanese Laid-Open Patent Publication No. 2008-040171, Japanese Laid-Open Patent Publication No.

2006-011175, International Publication No. 2004/113966, and references thereof. The entire disclosure of Japanese Laid-Open Patent Publication No. 2010-189212, Japanese Laid-Open Patent Publication No. 2008-040171, Japanese Laid-Open Patent Publication No. 2006-011175, International Publication No. 2004/113966 is incorporated herein by reference.

As the low-refractive index regions 80*a* having a void structure, porous silica can be suitably used. Porous silica can be produced by the following method, for example: a method involving hydrolyzing and polycondensing at least one of silicon compounds, hydrolyzable silanes and/or silsesquioxanes, and their partial hydrolysates and dehydration-condensation products; a method that uses porous particles and/or hollow microparticles; and a method that generates an aerogel layer using the springback phenomenon, a method of pulverizing a gelatinous silicon compound obtained by sol-gel processing and using a pulverized gel in which micropored particles as the resultant pulverized body are chemically bonded to one another with a catalyst or the like; and so on. However, the low-refractive index regions 80*a* are not limited to porous silica, and the production method is not limited to the exemplified production methods; any production method may be used for production. Silsesquioxane is a silicon compound with ($RSiO_{1.5}$; where R is a hydrocarbon group) as the basic structural unit. Although silsesquioxane is not exactly the same as silica, whose basic structural unit is $SiO_2$, it has a network structure cross-linked by siloxane bonds, similarly to silica. Therefore, any porous material that contains silsesquioxane as its basic structural unit is also referred to as porous silica or silica-based porous material.

Porous silica may be composed of micropored particles of a gelatinous silicon compound that are bonded to one another. An example of micropored particles of a gelatinous silicon compound is a pulverized body of the gelatinous silicon compound. Porous silica may be formed by coating a base with a coating solution that contains a pulverized body of a gelatinous silicon compound, for example. The pulverized body of the gelatinous silicon compound may chemically bonded (e.g., siloxane bonded) through catalytic action, light irradiation, heating, or the like, for example.

Embodiment 4

Figure 10:
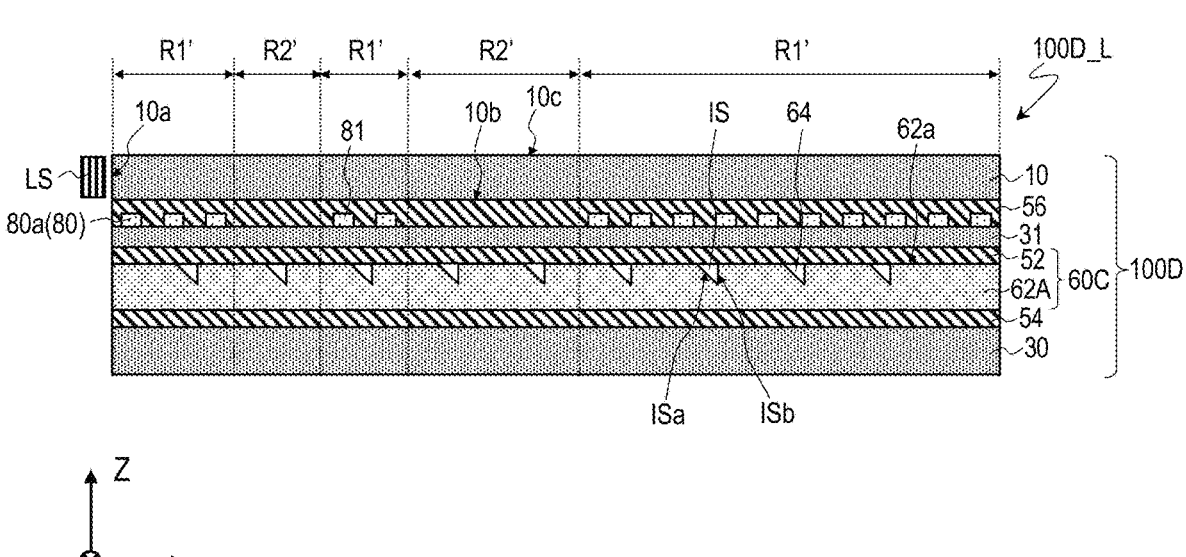
FIG. 10 A cross-sectional view schematically showing a light emission device 100D_L according to an embodiment of the present invention.

With reference to FIG. 10, a light emission device 100D_L according to the present embodiment will be described. FIG. 10 is a cross-sectional view schematically showing the light emission device 100D_L. The following description will be mainly directed to differences of the light emission device 100D_L according to the present embodiment from the light emission device 100C_L according to Embodiment 3.

As shown in FIG. 10, a lightguide component 100D included in the light emission device 100D_L includes a light distribution controlling structure having a plurality of internal spaces IS. The light distribution controlling structure having a plurality of internal spaces IS is formed in a redirection layer 60C that is provided at the third principal face 10*b* side of the lightguide layer 10. The redirection layer 60C is composed of: a textured film 62A that includes a fifth principal face 62*a* having a plurality of recesses 64; and an adhesive layer 52 that is disposed on the fifth principal face 62*a* side of the textured film 62A.

The plurality of recesses 64 in the textured film 62A are formed across essentially the entire lightguide component 100D in a plan view, and are not buried by the adhesive layer

52. Therefore, in a plan view, the plurality of internal spaces IS are provided across essentially the entire lightguide component 100D.

Moreover, the lightguide component 100D further includes a light coupling layer 80 that is provided between the lightguide layer 10 and the redirection layer 60C. The light coupling layer 80 includes a plurality of low-refractive index regions 80a that have a refractive index $n_C$ smaller than the refractive index $n_{GP}$ of the lightguide layer 10.

The light emission device 100D_L according to the present embodiment includes: regions (hereinafter referred to as "first regions") R1' in which the light coupling layer 80 is present, and regions (hereinafter referred to as "second regions") R2' in which the light coupling layer 80 is not present. The first regions R1' and the second regions R2' are disposed so as to define a predetermined design in a plan view from a normal direction of the first principal face. Although not shown here, the first regions R1' and the second regions R2' may be disposed in a similar manner to the first regions R1 and the second regions R2 depicted in FIG. 2.

In the first regions R1', in which the light coupling layer 80 is present, light propagating in the lightguide layer 10 is less likely to reach the light distribution controlling structure (internal spaces IS) because of total reflection at the light coupling layer 80. Therefore, the first regions R1', in which the light coupling layer 80 is present, are regions (low-luminance emitting regions) that emit light at a relatively low luminance n an activated state (or substantially do not emit light). On the other hand, the second regions R2', in which the light coupling layer 80 is not present, are regions (high-luminance emitting regions) that emit light at a relatively high luminance in an activated state.

Herein, each low-refractive index region 80a is a porous region 81 having an internal void structure; in the present embodiment, the first regions R1' and the second regions R2' are differentiate based on whether the porous regions 81 are formed or not. As shown in FIG. 10, the plurality of porous regions 81 are formed only in the first regions R1' and not in the second regions R2' (i.e., selectively in the first regions R1'). As has already been described, the plurality of low-refractive index regions 80a are the plurality of porous regions 81 having an internal void structure (i.e., defined by the plurality of porous regions 81). Therefore, any region in which porous regions 81 exist defines a first region R1' in which the light coupling layer 80 is present. On the other hand, any region in which porous regions 81 do not exist defines a second region R2' in which the light coupling layer 80 is not present.

As described above, in the light emission device 100D_L according to the present embodiment, the first regions R1', in which the light coupling layer 80 is present, and the second regions R2', in which the light coupling layer 80 is not present, are disposed so as to define a predetermined design, thus allowing light to be emitted in such a manner that a predetermined design will be visually recognized. As a result, illumination (light emission) that is full of fancifulness and fun can be realized.

Moreover, the light emission device 100D_L according to the present embodiment includes a light distribution controlling structure having a plurality of internal spaces IS (i.e., utilizing internal total reflection), a high transparency (visible light transmittance) can be achieved. Furthermore, a sheet-shaped light emission device 100D_L is suitably used as a light emission device for on-board use.

As a method for selectively forming low-refractive index regions 80a (porous regions 81) in the first regions R1', an application technique or a printing technique can be suitably used. In the case of using an application technique, a mask having a predetermined pattern may be used in performing application. As a printing technique, a plate-based printing technique such as gravure printing may be used, or a plateless printing technique such as inkjet printing may be used.

Embodiment 5

Figure 11:
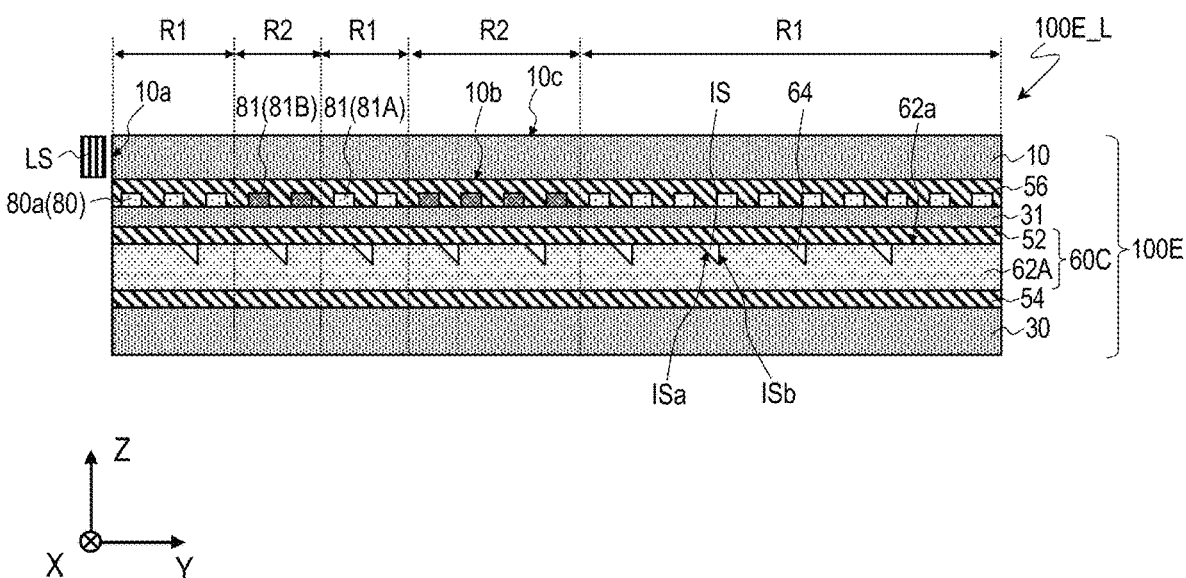
FIG. 11 A cross-sectional view schematically showing a light emission device 100E_L according to an embodiment of the present invention.

With reference to FIG. 11, a light emission device (illumination device) 100E_L according to the present embodiment will be described. FIG. 11 is a cross-sectional view schematically showing the light emission device 100E_L. The following description will be mainly directed to differences of the light emission device 100E_L according to the present embodiment from the light emission device 100D_L according to Embodiment 4.

As shown in FIG. 11, a lightguide component 100E included in the light emission device 100E_L includes a light distribution controlling structure having a plurality of internal spaces IS. The light distribution controlling structure having a plurality of internal spaces IS is formed in a redirection layer 60C that is provided at the third principal face 10b side of the lightguide layer 10. The redirection r 60C is similar in configuration to the redirection layer 60C of the light emission device 100D_L according to Embodiment 4.

Moreover, the lightguide component 100E includes a light coupling layer 80 that is provided between the lightguide layer 10 and the redirection layer 60C. The light coupling layer 80 includes a plurality of low-refractive index regions 80a that have a refractive index $n_C$ smaller than the refractive index $n_{GP}$ of the lightguide layer 10. The plurality of low-refractive index regions 80a are a plurality of porous regions 81 having an internal void structure.

The light emission device 100E_L according to the present embodiment also includes first regions R1', in which the light coupling layer 80 is present, and second regions R2', in which the light coupling layer 80 is not present. The first regions R1' and the second regions R2' are disposed so as to define a predetermined design in a plan view from a normal direction of the first principal face.

In the present embodiment, the first regions R1' and the second regions R2' are differentiated based on whether or not the void structure of the porous regions 81 is buried by an adhesive layer 56 that is provided in contact with the plurality of porous regions 81. As shown in FIG. 11, the plurality of porous regions 81 include: a plurality of first porous regions 81A which are located in the first regions R1' and in which the void structure is not buried by the adhesive layer 56; and a plurality of second porous regions 818 which are located in the second regions R2' and in which the void structure is substantially buried by the adhesive layer 56.

Any region in which the second porous regions 81B are located, where the void structure is substantially buried by the adhesive layer 56, does not function as the light coupling layer 80. In other words, the plurality of low-refractive index regions 80a are defined by the plurality of first porous regions 81A, in which the void structure is not buried by the adhesive layer 56.

As the adhesive layer 56, those which were exemplified as suitable adhesives for forming the adhesive layer 52 can be used. In order for the adhesive layer 56 to substantially bury the void structure of the second porous regions 81B without burying the void structure of the first porous regions 81A among the plurality of porous regions 81, for example, when using a laminating machine to attach together a stacked structure including the plurality of porous regions 81 and the base layer 31 and the lightguide layer 10 via the adhesive layer 56, a mask having a mask pattern that corresponds to the placement of the first regions R1' and the second regions R2' (apertures corresponding to the first regions R1') may be used. Various conditions (e.g., the nip pressure of the laminating machine) involved in the attaching together may be appropriately set in accordance with the specifications of the adhesive used, the size of the porous regions 81, and the like.

Note that the void structure in the second porous regions 818 does not need to be completely buried by the adhesive layer 56, but may be substantially buried only to an extent where it no longer functions as the light coupling layer 80. Even in the case where the void structure in the second porous regions 818 is completely buried by the adhesive layer 56, the refractive index of the second porous regions 81B and the refractive index of the adhesive layer 56 may not entirely match. The difference between the refractive index of the second porous regions 818 and the refractive index of the adhesive layer 56 is preferably 0.3 or less, and more preferably 0.2 or less.

Similarly to the light emission device 100D_L according to Embodiment 4, the light emission device 100E_L according to the present embodiment is also able to emit light in a predetermined design, and achieve a high transparency (visible light transmittance).

Although the aforementioned example illustrates a configuration in which the void structure in the second porous regions 818 is buried by the adhesive layer 56, the second porous regions 818 may be substantially buried with any material, other than the adhesive layer 56, so as not to function as the light coupling layer 80. In that case, after selectively burying the void structure in some porous regions 81 among the plurality of porous regions 81 (i.e., the porous regions 81 to become the second porous regions 81B) with some material, a stacked structure including the plurality of porous regions 81 and the base layer 31 and the lightguide layer 10 may be attached together, etc., via the adhesive layer 56, thereby layering the stacked structure and the lightguide layer 10. The material to bury the void structure in the second porous regions 818 is preferably a material such that the difference between the refractive index of the second porous regions 818 and the refractive index of the adhesive layer 56 is 0.3 or less, and more preferably 0.2 or less.

Embodiment 6

Figure 12:
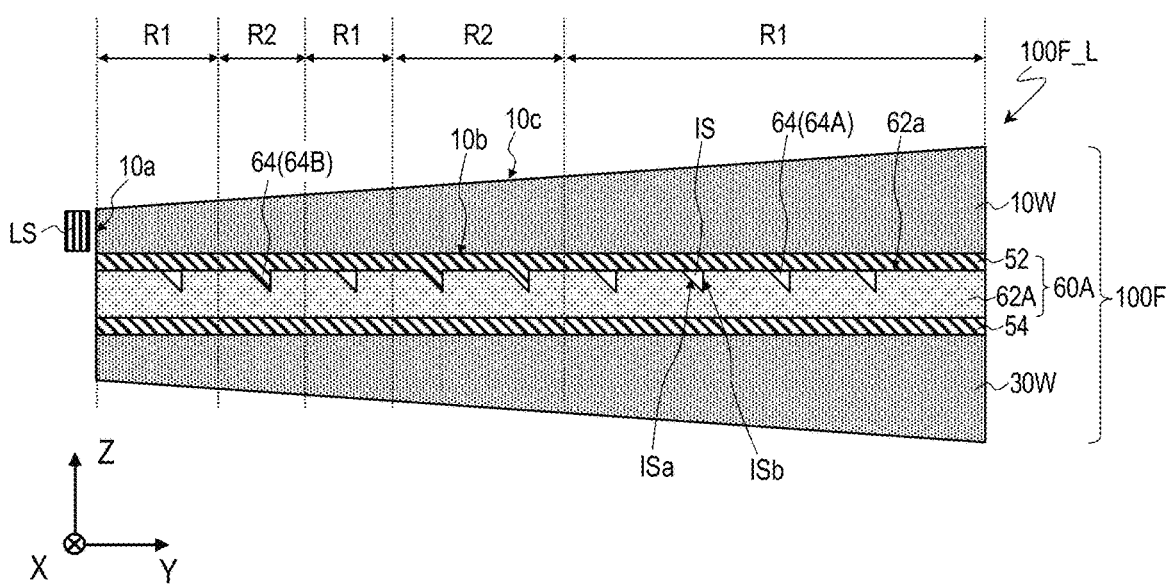
FIG. 12 A cross-sectional view schematically showing a light emission device 100F_L according to an embodiment of the present invention.

With reference to FIG. 12, a light emission device (illumination device) 100F_L according to the present embodiment will be described. FIG. 12 is a cross-sectional view schematically showing the light emission device 100F_L. The following description will be mainly directed to differences of the light emission device 100F_L according to the present embodiment from the light emission device 100A_L according to Embodiment 1.

As shown in FIG. 12, a lightguide component 100F included in the light emission device 100F_L differs from the lightguide component 100A of the light emission device 100A_L in that a lightguide layer 10W and a base layer 30W increase in thickness away from the light-receiving side face 10a (i.e., from the light source LS). In other words, each of the lightguide layer 10W and the base layer 30W of the lightguide component 100F is formed in a wedge shape.

In the lightguide layer 10W whose thickness increases away from the light-receiving side face 10a, as compared to the lightguide layer 10 whose thickness is constant, the angle between light that goes toward the fourth principal face 10c while propagating in the lightguide layer 10W in the Y direction and the fourth principal face 10c is small (i.e., there is a large incident angle with respect to the fourth principal face 10c), thus resulting in less light (stray light) leaking from the fourth principal face 10c. Therefore, directivity toward one side is improved.

In the base layer 30W whose thickness increases away from the light source LS, too, stray light is reduced for similar reasons, and therefore directivity toward one side is improved. The wedge-shaped base layer 30W may have a similar thickness to that of the wedge-shaped lightguide layer 10w.

Figure 13:
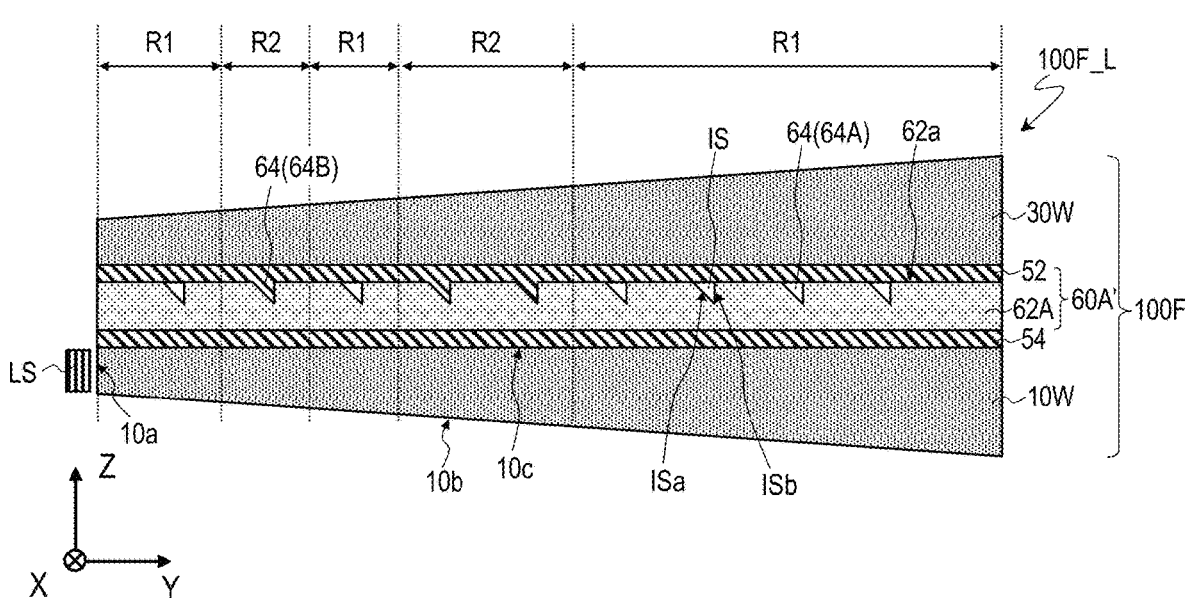
FIG. 13 A cross-sectional view schematically showing the light emission device 100F_L.

Note that similar modifications may be made to the example modification that was described with respect to the light emission device 100A_L according to Embodiment 1 by referring to FIG. 6. In other words, as shown in FIG. 13, a light distribution controlling structure may be formed in a redirection layer 60A' that is provided at the fourth principal face 10c side of the lightguide layer 10W.

Similarly to the example modification described with respect to the light emission device 100A_L according to Embodiment 1 by referring to FIG. 7, in addition to the light source LS to emit light toward the light-receiving side face 10a of the lightguide layer 10w, a further light source may be provided to emit light toward an end face of the base layer 30W (i.e., the end face located at the same side as the light-receiving side face 10a of the lightguide layer 10W). In this case, the base layer 30W may be regarded as functioning as a further lightguide layer.

Furthermore, one of the lightguide layer 10W and the base layer 30W may be replaced with a non-wedge-shaped counterpart.

Instead of the lightguide layer 10 and/or the base layer 30 of the light emission devices 100B_L, 100C_L, 100D_L, and 100E_L according to Embodiments 2 to 5, the wedge-shaped lightguide layer 10W and/or base layer 30W may be used.

Other Examples of Light Distribution Controlling Structure

Although the above description illustrates example configurations in which a light distribution controlling structure having a plurality of internal spaces IS is formed in a redirection layer that is provided on one of the two principal faces of the lightguide layer, a light distribution controlling structure having a plurality of internal spaces IS may be formed in the lightguide layer. Such a lightguide layer can be produced by attaching together an unpatterned first film and a second film having a desired minute pattern formed thereon by lamination technique, or by bonding them together with an adhesive (including a pressure-sensitive adhesive), for example.

The formation of a minute pattern onto the second film may utilize laser patterning, direct laser imaging, laser drilling, and laser or electron beam irradiation with or without a mask. The material and refractive index value may be modified by printing, inkjet printing, screen printing, or other methods to impart individual properties. They can also be produced by micro/nanodispensing, dosing, direct "writing," discrete laser sintering, micro electrical discharge machining (micro EDM), micromachining, micro forming, imprinting, embossing, and the like.

Anti-Reflection Layer, Anti-Glare Layer, and Hard Coat Layer

Without being limited to the aforementioned example, a light emission device according to an embodiment of the present invention permits various modifications. For example, instead of the base layer 30 of the light emission device 100A_L or the like, an anti-reflection layer, an anti-glare layer, and/or a hard coat layer (e.g., with a pencil hardness of H higher) may be provided. It will be appreciated that an anti-reflection layer, an anti-glare layer, and/or a hard coat layer may provided upon the base layer 30. Moreover, an anti-reflection layer, an anti-glare layer, and/or a hard coat layer may be provided at an opposite side of the lightguide layer 10 from the base layer 30. The anti-reflection layer, anti-glare layer, and hard coat layer can be formed by known methods by using known materials.

Application to Construction Components

The aforementioned transparent light emission devices of a sheet shape are used for construction components. The light emission device itself may be used as a construction component, or as a part of a construction component. Construction components include those for exterior applications and those for interior applications. For example, they can be used as window components, wall components, partitions, ceiling (skylight) components, staircase components, handrail components, or floor components. Otherwise, they can be used as light emission devices (illumination devices) for streets, crime prevention purposes, emergency uses, gardens, swimming pools/ponds (underwater), within warehouses, within factories, and under eaves (outdoors). All of them are utilized as transparent plates when not in use.

INDUSTRIAL APPLICABILITY

According to an embodiment of the present invention, a light emission device which can emit light in a predetermined design and which can provide sufficiently high transparency and a lightguide component for light emission devices suitable for use in such a light emission device can be provided. A light emission device according to an embodiment of the present invention is suitably used for on-board applications.

REFERENCE SIGNS LIST

10, 10W lightguide layer
30, 30W, 31 base layer
52, 54, 56 adhesive layer
60A, 60A', 60B, 60C redirection layer
62A, 62B textured film
64 recess
64A first recess
64B second recess
80 light coupling layer
80a low-refractive index region
81 porous region
81A first porous region
81B second porous region
100A, 100B, 100C, 100D, 100E, 100F lightguide component
100A_L, 100B_L, 100C_L light emission device
100D_L, 100E_L, 100F_L light emission device
IS internal space

ISa first slope
ISb second slope
LS light source
R1, R1' first region
R2, R2' second region

The invention claimed is:

1. A light emission device, comprising:
a light source; and
a lightguide component having a first principal face and a second principal face that is at an opposite side from the first principal face, the lightguide component including:
a lightguide layer including a light-receiving portion that receives light emitted from the light source, the lightguide layer further including a third principal face and a fourth principal face, wherein the third principal face is positioned closer to the first principal face side than a position of the fourth principal face to the first principal face side;
a light distribution controlling structure having a plurality of internal spaces, the plurality of internal spaces creating interfaces to direct a portion of the light propagating in the lightguide layer toward the first principal face via total internal reflection, wherein,
in a plan view from a normal direction of the first principal face, a first region in which the light distribution controlling structure is present and a second region in which the light distribution controlling structure is not present are disposed so as to define a predetermined design;
a textured film that includes a fifth principal face having a plurality of recesses that define the plurality of internal spaces, wherein,
the plurality of recesses include: a plurality of first recesses which are located in the first region and which are not buried; and a plurality of second recesses which are located in the second region and which are substantially buried;
a base layer provided vertically below the textured film;
an adhesive layer disposed at the fifth principal face side of the textured film so as to be positioned vertically above both the base layer and the textured film, wherein the adhesive layer is positioned vertically below the lightguide layer,
wherein, the plurality of first recesses are not buried by the adhesive layer, and wherein the plurality of second recesses are substantially buried by the adhesive layer;
the plurality of internal spaces is defined by the plurality of first recesses in the textured film;
wherein the light source is positioned vertically higher than the adhesive layer; and
with respect to a plan view of the lightguide component, the adhesive layer overlaps substantially the entire lightguide layer.
2. The light emission device of claim 1, wherein the plurality of internal spaces are formed in a redirection layer that is provided at the third principal face side or the fourth principal face side of the lightguide layer.
3. The light emission device of claim 2, further comprising a light coupling layer provided between the lightguide layer and the redirection layer, wherein the light coupling layer includes a plurality of low-refractive index regions that have a refractive index smaller than a refractive index of the lightguide layer.

4. A light emission device, comprising:

a light source; and a lightguide component having a first principal face and a second principal face that is at an opposite side from the first principal face, the lightguide component including:

a lightguide layer including a light-receiving portion that receives light emitted from the light source, the lightguide layer further including a third principal face and a fourth principal face, wherein the third principal face is positioned closer to the first principal face side than a position of the fourth principal face to the first principal face side;

a light distribution controlling structure having a plurality of internal spaces, the plurality of internal spaces creating interfaces to direct a portion of the light propagating in the lightguide layer toward the first principal face via total internal reflection, wherein, the plurality of internal spaces are formed in a redirection layer that is provided at the third principal face side or the fourth principal face side of the lightguide layer, the lightguide component for light emission devices further comprising a light coupling layer provided between the lightguide layer and the redirection layer, the light coupling layer including a plurality of low-refractive index regions that have a refractive index smaller than a refractive index of the lightguide layer, wherein, in a plan view from a normal direction of the first principal face, a first region in which the light coupling layer is present and a second region in which the light coupling layer is not present are disposed so as to define a predetermined design;

a plurality of porous regions provided between the lightguide layer and the redirection layer, the plurality of porous regions having an internal void structure, wherein, the plurality of porous regions include: a plurality of first porous regions which are located in the first region and in which the void structure is not buried; and a plurality of second porous regions which are located in the second region and in which the void structure is substantially buried;

a base layer provided vertically below the redirection layer;

an adhesive layer provided in contact with the plurality of porous regions so as to be positioned vertically above the base layer, wherein the adhesive layer is positioned vertically below the lightguide layer, wherein, the void structure of the plurality of first porous regions is not buried by the adhesive layer, and the void structure of the plurality of second porous regions is substantially buried by the adhesive layer;

the plurality of low-refractive index regions are defined by the plurality of first porous regions;

wherein the light source is positioned vertically higher than the adhesive layer; and with respect to a plan view of the lightguide component, the adhesive layer overlaps substantially the entire lightguide layer.

5. The light emission device of claim 1, wherein the lightguide layer increases in thickness away from the light-receiving portion.

* * * * *